Patented Mar. 8, 1932

1,848,660

UNITED STATES PATENT OFFICE

ERICH RENKWITZ, OF ASCHAFFENBURG-LEIDER, GERMANY, ASSIGNOR TO THE FIRM OF STAHL-CHEMIE G. M. B. H., OF FRANKFORT-ON-THE-MAIN, GERMANY, A SOCIETY OF GERMANY

PROCESS OF MANUFACTURING A RED PIGMENT OF IRON OXIDE

No Drawing. Application filed December 5, 1930, Serial No. 500,414, and in Germany July 11, 1930.

The invention relates to the manufacture of a red pigment of iron oxide having a particularly high colouring power and purity of colour.

According to the processes known heretofore, it has not been possible to obtain a serviceable red iron oxide either from precipitated ferric hydroxides, of the chemical composition $Fe(OH)_3$ or from the iron rust, which as a hydroxide having little water has approximately a composition such as about 78-85 per cent. $Fe_2O_3$, 0.5-4 per cent. FeO and 14.5-18 per cent $H_2O$ even after calcining for periods up to 18 hours, because of the calcined products exhibit and unslightly brown or violet colour of extremely low colouring power. Attempts have also been made already to convert precipitated ferric hydroxides into a red iron oxide by boiling under pressure in water as well as in ferric salt solutions or other solutions. Even with the use of pressures up to 20 atmospheres, however, only weakly coloured products have been obtained by this method. Neither are satisfactory results obtained by calcining a mixture of ferric hydroxide with ferric chloride. According to all these processes, only brown ferric hydroxides having little water and of the composition $Fe_2O_3.H_2O$ or the sealing-wax red hydrate of the composition $2Fe_2O_3.H_2O$ have been obtained, both of which compounds possess only a small colouring power.

It has now been found that by avoiding the calcining processes, regarded heretofore as absolutely necessary, an iron oxide of extremely high colouring power and having a pure red tint may be obtained if iron rust or ferric hydroxides having little water, of natural or artificial origin and having the composition and structure of ordinary iron rust, which in view of its chemical constitution as a hydroxide having little water and traces of ferrous oxide as a result of its origin, appears to have a particular activity are, after moistening with suitable, preferably small, quantities of a suitably diluted ferric salt solution heated in closed vessels under pressure, preferably of about 3 to 6 atmospheres.

In place of a ferric salt solution, chemical reagents which are capable of supplying a ferric salt solution on meeting with the raw materials may also be used, such reagents being, for example, hydrochloric acid, sulphuric acid and the like in suitable dilution.

Temperatures around 130-150° C. and above may be used in the heating process. The splitting off of water and therewith the conversion of the hydroxide takes place even at these comparatively low temperatures of the reaction mixture, which is in the aqueous state.

The iron oxides thus obtained are remarkable for their extraordinary colouring power and brilliant red tint of great purity and in addition are considerably superior in fineness to the oxides manufactured by known processes, because for example, the so-called English reds, produced in the calcination process, can only be obtained in a coarse form owing to the effect of the high temperatures.

In carrying out the process according to the invention, it has been found to be very advantageous in certain circumstances for the purpose of obtaining fine gradation of tints, for example, for obtaining a red, blue-tinged tint, in the described wet process using only very dilute ferric salt solutions, to heat the reaction mixture for a short time only. It has been found that by suitably regulating these conditions, the resulting tint may be influenced to a considerable extent, and that the colouring power is in no wise affected thereby.

The added ferric salt solution, in the described reaction, does not take part in the chemical reaction, apart from the elimination of the traces of ferrous oxide present in the iron rust or in the ferric hydroxides having little water which are used, but only acts as a contact substance.

Examples 1. 100 kilograms of iron rust are mixed with 15 litres of a 10 per cent ferric chloride solution to a stiff, cement-like paste and heated in closed vessels for 2-5 hours at 3-6 atmospheres.

2. 100 kilograms of iron rust are mixed to a paste with 20 litres of dilute, about 20 per cent hydrochloric acid and heated in closed vessels for 1-2 hours at 3-4 atmospheres.

In carrying into practice the invention according to the above examples for the purpose of converting the iron rust or ferric hydroxides of the composition and structure of ordinary rust into a red iron oxide, a stiff cement-like mixture is subjected to the treatment, but a substantially more diluted reaction mixture may be used in place thereof if the treatment is carried out in the presence of suitable quantities of sulphur.

It has been found that still more highly valuable end products may thereby be obtained if desired. In carrying out this mode of procedure, either elementary sulphur may be used, or a start may be made with raw materials containing sulphur, for example, during the formation of the iron hydroxides having little water, by causing in suitable manner sulphur to be formed chemically at the same time from suitable sulphur compounds, also for example from iron sulphur compounds, or by precipitating the sulphur together with the ferric hydroxides having little water which is formed. In this mode of operation, the sulphur in no wise takes part in the chemical reaction which transforms the iron compounds, nor is it chemically altered itself, but remains entirely preserved in the reaction mixture. It may be removed from the product in known manner, for example, by extraction.

The above described mode of operation in the presence of sulphur, owing to the greater dilution of the reaction mixture, and to the work of stirring being thereby simplified, affords more particularly the advantage of allowing a more simple apparatus to be used, thereby making the entire process more economical.

The following example is given in addition for the described modification of the process according to the invention.

100 kilograms of iron rust are suspended in 100 litres of a 3 per cent ferric chloride solution and mixed with 30 grams of finely divided sulphur. The thinly fluid mixture is heated in closed vessels for 2 to 5 hours under a pressure of 3 to 6 atmospheres.

I claim:

1. A process of manufacturing a red pigment of iron oxide, consisting in mixing a ferric salt solution with an iron oxygen compound having the composition and structure of natural iron rust and consisting of not over 85% $Fe_2O_3$, not less than 0.5% FeO and not over 18% $H_2O$, and thereupon heating the mixture under pressure.

2. A process of manufacturing a red pigment of iron oxide, consisting in mixing a ferric salt solution with an iron oxygen compound having the composition and structure of natural iron rust and consisting of not over 85% $Fe_2O_3$, not less than 0.5% FeO and not over 18% $H_2O$, and thereupon heating the mixture under a pressure of 3 to 6 atmospheres.

3. A process of manufacturing a red pigment of iron oxide, consisting in mixing a ferric salt solution with an iron oxygen compound having the composition and structure of natural iron rust and consisting of not over 85% $Fe_2O_3$, not less than 0.5% FeO and not over 18% $H_2O$, and thereupon heating the mixture under pressure at between 130 and 150° C.

4. A process of manufacturing a red pigment of iron oxide, consisting in mixing a ferric salt solution with an iron oxygen compound having the composition and structure of natural iron rust and consisting of not over 85% $Fe_2O_3$, not less than 0.5% FeO and not over 18% $H_2O$, and thereupon heating the mixture under a pressure of 3 to 6 atmospheres at between 130 and 150° C.

5. A process of manufacturing a red pigment of iron oxide, consisting in mixing a ferric salt solution with an iron oxygen compound having the composition and structure of natural iron rust and consisting of not over 85% $Fe_2O_3$, not less than 0.5% FeO and not over 18% $H_2O$, and thereupon heating the mixture under a pressure of 3 to 6 atmospheres at between 130 and 150° C., and in the presence of sulfur.

6. A process of manufacturing a red pigment of iron oxide, consisting in mixing about 100 kgs. of iron rust with 15 litres of 10% ferric chloride solution until a stiff cement-like paste is obtained, then heating the mixture in a closed vessel for about 2 to 5 hours under a pressure of 3 to 6 atmospheres.

7. A process of manufacturing a red pigment of iron oxide, consisting in mixing about 100 kgs. of iron rust with 20 litres of diluted hydrochloric acid of 20% strength until a stiff, cement-like paste is obtained, and then heating the mixture in a closed vessel for about 2 hours under a pressure of 3 to 4 atmospheres.

In testimony whereof I affix my signature.

ERICH RENKWITZ.